United States Patent
Scheja et al.

(10) Patent No.: US 10,089,804 B2
(45) Date of Patent: Oct. 2, 2018

(54) METHOD AND APPARATUS FOR INCREASING RELIABILITY IN MONITORING SYSTEMS

(71) Applicant: Axis AB, Lund (SE)

(72) Inventors: Gustaf Scheja, Furulund (SE); Christoffer Cronström, Lund (SE)

(73) Assignee: Axis AB, Lund (SE)

( * ) Notice: Subject to any disclaimer, the term of this patent is extended or adjusted under 35 U.S.C. 154(b) by 173 days.

(21) Appl. No.: 15/254,690

(22) Filed: Sep. 1, 2016

(65) Prior Publication Data

US 2017/0069149 A1 Mar. 9, 2017

(30) Foreign Application Priority Data

Sep. 3, 2015 (EP) .................................. 15183611

(51) Int. Cl.
*G07C 9/00* (2006.01)
*H04W 4/80* (2018.01)

(52) U.S. Cl.
CPC ...... *G07C 9/00111* (2013.01); *G07C 9/00023* (2013.01); *G07C 9/00103* (2013.01); *G07C 9/00571* (2013.01); *H04W 4/80* (2018.02); *G07C 9/00309* (2013.01); *G07C 2009/00769* (2013.01)

(58) Field of Classification Search
CPC ............ G07C 9/00111; G07C 9/00023; G07C 9/00103; G07C 9/00571; H04W 4/80
USPC .................................................. 340/5.6–5.65
See application file for complete search history.

(56) References Cited

U.S. PATENT DOCUMENTS

| | | | |
|---|---|---|---|
| 4,004,134 A | 1/1977 | Hwang | |
| 8,598,982 B2* | 12/2013 | Bhandari | G06F 21/73 340/5.22 |
| 8,629,755 B2* | 1/2014 | Hashim-Waris | G06Q 30/0235 340/10.1 |
| 2008/0216156 A1 | 9/2008 | Kosaka | |
| 2010/0031328 A1* | 2/2010 | Hodgkinson | G06F 21/33 726/5 |
| 2015/0206367 A1 | 7/2015 | Goldman et al. | |
| 2016/0092858 A1* | 3/2016 | Giles | G06Q 20/227 705/14.1 |

OTHER PUBLICATIONS

EP 15 18 3611.1 European Search Report (dated Mar. 2, 2016).

* cited by examiner

*Primary Examiner* — Allen T Cao
(74) *Attorney, Agent, or Firm* — Volpe and Koenig, P.C.

(57) ABSTRACT

The disclosure relates to a technology for allowing access to an area having a blocked entrance, wherein the blocking of the entrance is controlled by an access controller arranged to unblock the entrance upon receipt of an authorized credential. The technology is implemented to repeatedly updating an override credential in the access controller, sending updated override credential the access controller to a remote node, repeatedly checking the connectivity between the remote node and the access controller, detecting failure of connectivity between the access controller and the remote node, setting the override credential as an authorized credential in the access controller in response to the detection of failure of connectivity, and allowing access through the blocked entrance upon receipt of the override credential in an access request to the area received by the access controller.

16 Claims, 9 Drawing Sheets

METHOD AND APPARATUS FOR INCREASING RELIABILITY IN MONITORING SYSTEMS

FIELD OF INVENTION

The disclosure relates to the technical area of accessing blocked physical areas, e.g. blocked by a gate, a door, or any other obstacle that may be locked to hinder physical beings or devices from entering into the area. In particular, the disclosure is related to methods for allowing entrance through a blocked entrance.

BACKGROUND

Conventional methods for blocking and allowing access to an area via a locked entrance includes the use of a mechanical key, handled by a user, and a corresponding mechanical lock at the device blocking the entrance, e.g. an ordinary door having a mechanical lock. However, this old fashioned mechanical physical access control method is not very practical in some situations. For instance if you have a person that should have temporary access to the area then you would have to give that person an extra key for them to return to you when they should not have access to the area anymore. This key may be copied without permission and the person who had temporary access may thus gain access to the area until the lock is substituted for another lock. In another example you may want to allow a person access to the area only between 10 and 12 every Thursday. Such a scheme will be difficult to manage with mechanical keys. In order to allow such complicated access schemes electronic access systems are used.

There are various system designs for electronic access systems. For instance the electronic access system may be of a type having a centralised authentication system for authenticating credentials provided at a locked passage to an area and for authorising the unlocking of the passage. In another system the operation of authentication is distributed in a network to access controllers which are directly connected to the lock of the passage and which are arranged to authorise unlocking of the passage if a holder of an authenticated credential provided is authorized to pass into the area connected to the passage.

The credentials in these types of systems may be provided by the user at a device arranged to read credentials, i.e. a card reader, a keypad reading a code entered by a user, a reader of graphical codes such as barcodes or QR-codes, an Near Field Communication (NFC) reader, an RFID reader, a biometric scanner, e.g., reading fingerprints or retinas. Devices for reading credentials have to be connected to the access system in some way and generally they have to be connected via a cable to the centralised authentication system or a distributed access controller. The device for providing the credentials may also be a handheld device arranged to communicate over a cellular telephone network. In a system using a handheld device like this, a credential identifying the handheld device or the user using it is sent over the cellular telephone network to a gateway passing on the credential to an access network including the devices controlling the access to the area into which the user request access. Depending on the system the credential is either authenticated at a central authentication server or at a distributed access controller and then access is authorized centrally or at the distributed access controller. A temporary access credential may be allowed in these types of systems. However, if the network connection to the entrance of the area to access is down for one reason or another then the centralised system does not work as the authentication and authorisation is performed centrally and the signal to allow access cannot be passed to the lock of the door due to the network connection being down. This problem is partly solved by using local access controllers in a distributed system as the authentication and authorisation may be performed locally at the entrance to the area. One requirement for this latter to work properly is that the temporary access credential has been registered in the local access controller at the position of the entrance to the area before the network connection to the rest of the network or at least to the part of the network including the gateway to the cellular network and/or a credential setting service (which may be provided in any number of access controllers in the system) has been disconnected from each other. If this is not the case then the access controller have not received information relating to the temporary access credential. Anyhow, the handheld device communicating over the cellular telephone network is not able to communicate with the access controller at the entry to the area anyway as it is trying to communicate via the cellular network and the presently disconnected connection to the part of the network including the gateway.

Hence the problem with the known access systems is that they only work as long as the controller controlling the lock to the passage into the area is connected to the network.

SUMMARY

One object of the present disclosure is to provide an improved access system. For instance to enable flexible authorisation even when communication failures occurs. Another object is to provide high security in the access system.

According to a first aspect, these and other objects are achieved, in full or at least in part, by a method for allowing access to an area having a blocked entrance, wherein the blocking of the entrance is controlled by an access controller arranged to unblock said entrance upon receipt of an authorized credential. The method comprises repeatedly updating an override credential in the access controller, sending updated override credential from the access controller to a remote node, repeatedly checking the connectivity between the remote node and the access controller, detecting failure of connectivity between the access controller and the remote node, setting the override credential as an authorized credential in the access controller in response to said detection of failure of connectivity, and allowing access through the blocked entrance upon receipt of the override credential in an access request to the area received by the access controller.

One advantage of repeatedly generating new override credentials in an access controller for the access controller is that the security of the system is increased. For instance, a person receiving an override credential for some reason will not be able to use the credential for a longer time period. Another related advantage is that the override credential only is authorized when no connectivity to the remote node is detected. This increases the security even more in that the time using the override credential is limited and will be shifted as soon as the connection problem is fixed. Hence, this way of using the override credentials may be much advantageous for service technicians or repair personnel and allowing flexible authorisation. Another advantage of this particular use of override credentials is that access to the area behind the blocked entrance may be achieved even if no one of the devices involved in the access system at the site is able to contact the rest of the system, i.e. the system that is not at the site. The override credential may be downloaded to a handheld device of the user when the user is at another site where the handheld device is having a connection to the access system. Then both the access controller and the handheld device of the user know the override credential when the user attempts to access the area.

In other embodiments the method further comprises the act of initiating a wireless short range communication access point in response to said detection of failure of connectivity, said wireless short range communication access point being arranged to communicate with the access controller. The advantage of only activating the short range communication when the connection fails is that the security is kept high during normal operation and a possibly lower security level is only temporarily allowed when the connection is down. This also makes it possible to even better utilise the override credentials in a secure fashion.

The wireless short range communication access point may be arranged in the same housing as the access controller. Moreover, the method may further comprise the act of receiving at the access controller from a handheld communication device the access request including the override credential which makes the access system flexible and simple as you avoid installing devices at the site of the entrance which devices only would be used in a connection failure scenario.

The handheld communication device may be enabled to communicate via a cellular network and the remote node may be arranged in a remote network and could be accessible via the cellular network. In this setup the method could also comprise the act of sending from the handheld device to the remote node in the remote network via the cellular network an access request for the entrance controlled by the access controller. The advantage of this process step is that it may be used both when the connection between the access controller and the remote node is operating properly and when it is failing and, thus, require less changes to the system in order to adapt to failing connections.

Further, the access controller may be connected to a local network, the remote node may be connected to a remote network, and/or the access controller may be connected to the remote node for communication via a remote network connection.

According to a second aspect, the above objects and other objects are achieved, in full or at least in part, by an access controller for controlling access to an area. Such access controller comprises an I/O-interface arranged to send signals to an entrance for unlocking or locking the entrance, a network interface for communicating with an access system, a memory, an override credential generator arranged to repeatedly update an override credential, send it via the network interface and store it in the memory, connection tester arranged to test a connection with a remote node in the system, and authorisation indicator connected to the stored override credential indicating whether the override credential is authorized for access or not, the authorisation indicator being controlled based on result from connection tester. The advantage of the override credential generator combined with the connection tester is that the security of the system may be increased and simultaneously may the flexibility of the access system be kept at a high level.

Access controller may further comprise a short range communication access point arranged to be initiated when connection tester detects connection failure. This arrangement further increases the security in that the short range connection only is up when a problem with the connection is detected. Further, the short range communication access point may be arranged in the same housing as the access controller. Moreover, the access controller may also comprise an authenticator arranged to receive an access request from the short range communication access point and to send an unlock signal via the I/O-interface.

According to a third aspect, the above objects and other objects are achieved, in full or at least in part, by a method for allowing access to an area having a blocked entrance, wherein the blocking of the entrance is controlled by an access controller arranged to unblock said entrance upon receipt of an authorized credential, and wherein the access controller is part of an access control system and communicates with a remote node, also being part of the access control system, via a remote network connection. The method comprises detecting failure of connectivity over the network connection between the access controller and the remote node, initiating a wireless short range communication access point in response to said detection of failure of connectivity, said wireless short range communication access point being initiated by the access controller, and receiving at the access controller via said wireless short range communication access point a credential authorising the access controller to unblock said entrance and then allowing access to the area. By limit the activation time of the most likely less secure short range communication access point the system may become more secure and still allow the access system to be flexible.

Further the wireless short range communication access point may be arranged in the same housing as the access controller.

In other embodiments the method may further comprise repeatedly updating an override credential related to the access controller, sending updated override credential the access controller to the remote node, and setting the override credential as an authorized credential in the access controller in response to said detection of failure of connectivity, wherein the credential received at the access controller via said wireless short range communication access point is the override credential. The repeated generation of an override credential and the act of only authorise it when the connection between the access point and the remote node fails, further increase the security in that the override credential becomes difficult derive in other ways than the authorized way and a previously valid override credential will be obsolete also increasing the security of the system.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description. Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 1:
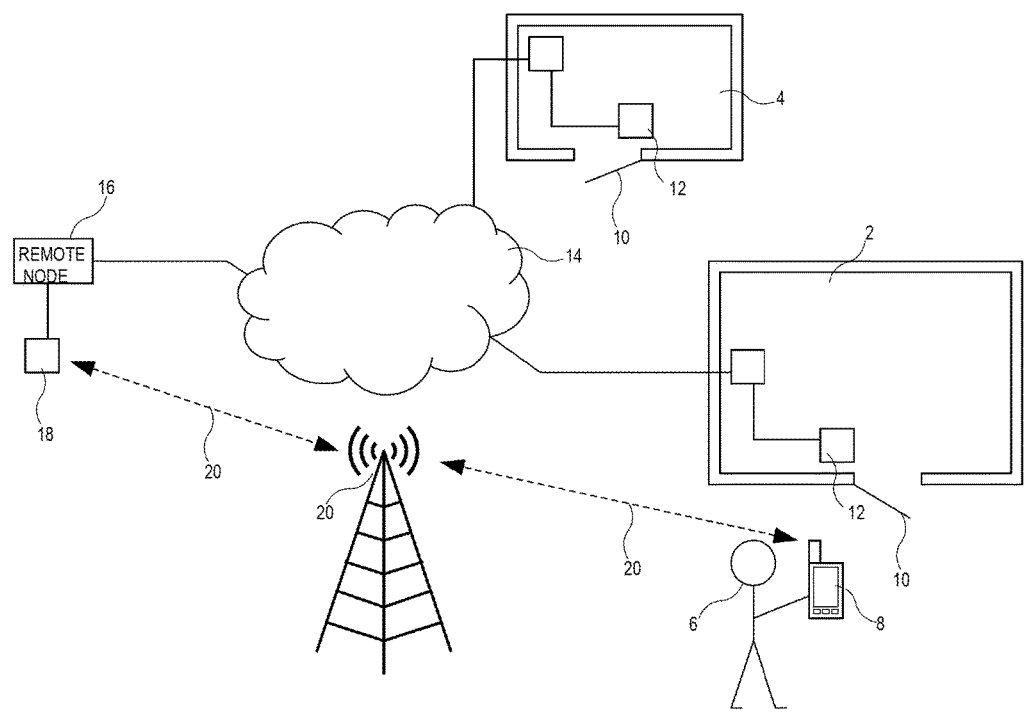
FIG. 1 is a schematic overview of a system that may include or implement embodiments.

An example access control system including means implementing embodiments in an example environment is showed in FIG. 1. The access control system is used to allow physical access for a user 6 to a restricted area 2, 4, when the user 6 presents authorized credentials to the access control system by using a handheld device 8. A handheld device 8 may be any type of handheld device or mobile device that is enabled to communicate over the cellular network and/or via short range wireless communications, e.g. mobile phones, personal digital assistants, lap tops, electronic tablets, etc. In the figure only two restricted areas 2, 4, are shown, however, the disclosure may readily be implemented in systems including additional restricted areas. Short range wireless communications may be any communication particularly suitable for communication over shorter distances, e.g., Bluetooth, ZigBee, Wi-Fi, Wireless LAN, etc. Access to the restricted area 2, 4, may be hindered by a door 10 or any other type of blocking device. Examples of other types of blocking devices in addition to all kinds of doors are all kinds of gates, turnstiles, booms, etc. The door 10 is controlled by an access controller 12 connected to a communication network 14 connecting the access controller 12 to a remote network node 16, which may be connected in a remote network. The remote node 16 includes or is connected to, directly or via a network, a gateway 18 interfacing communication over cellular telephone networks 20. However, the communication network 14 may also be a Wide Area Network (WAN) or the Internet connecting the access controller 12 at the restricted area 2, 4, with the remote network node 16. The connection alternatives that may be used in such a network are well known by the person skilled in the art, e.g. circuit switched telephone lines, radio waves, or optic fibre.

The access system showed in FIG. 1 may be an access system based on a distributed system in which each access controller is arranged to authenticate credentials and authorise unlocking of doors that are connected to the access controller. The distribution of the access system may in some embodiments be implemented so that each access controller keeps a copy of the credentials authorized in the system. In an alternative system the access controller stores authorized credentials that are likely to become relevant for the access controller, i.e. that a user with the authorized credential is likely to access the restricted area/areas that the access controller is arranged to allow access to. A system may of course implement a combination of these two systems as well.

Further, in this type of access system the remote node 16 is a networked device that has some storage capacity and may communicate with the access controllers 12 and with handheld devices 8 of users. It may also be taking part in distributing the access system in the same way as an access controller 12, it may even be an access controller 12.

In other embodiments the access system of FIG. 1 may include a centralised data base of all the authorized credentials in the system. In such system the access controllers 12 at the restricted areas 2, 4, may be ordered to allow access to a restricted area if a credential sent from the handheld device 8 is authorized by the information at the centralised data base for access to the area at the door where the handheld device is located when the access is requested.

Independent of which of these embodiments that are implemented the door that is to be opened may be identified using position coordinates of the handheld device, which may be included in the access request sent to the centralised data base. Alternatively the identification of the door may be performed by the user inputting a door number, selecting a door in a list of doors, scanning or taking a picture of a graphical code, e.g. a barcode, a QR-code, etc., selecting a position in a map, etc.

Figure 2A:
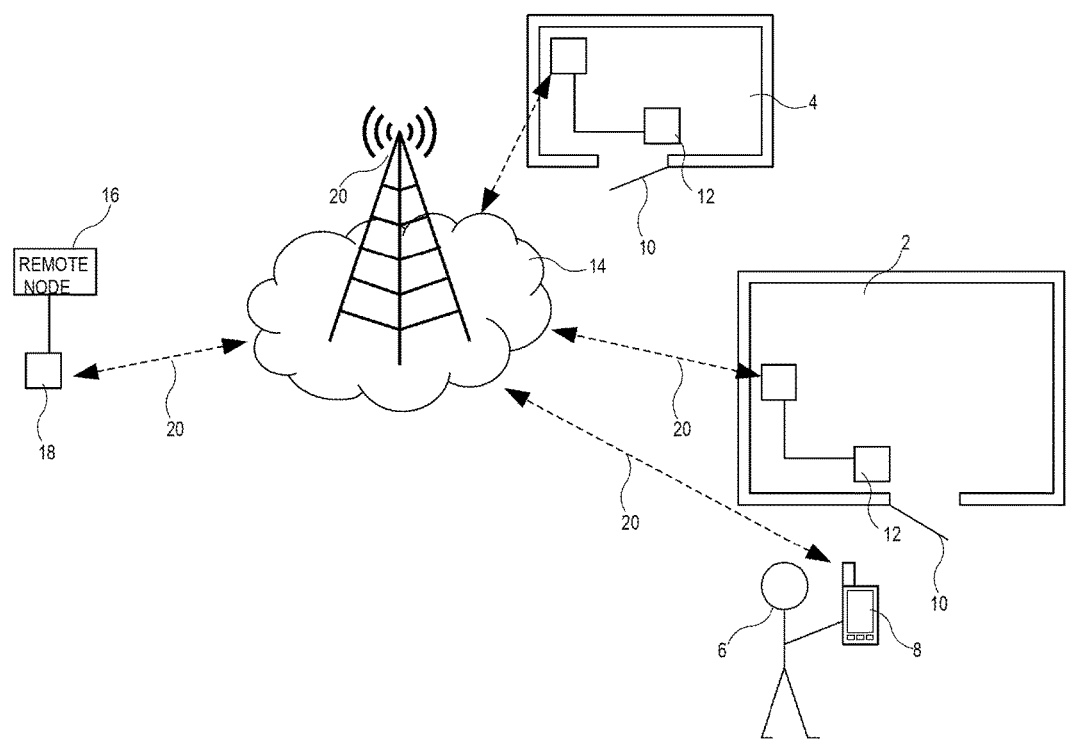
FIG. 2a is a schematic overview of an alternative system that may include or implement embodiments.

In FIG. 2a there is showed an access system very similar to the access system of FIG. 1. The main difference between the systems is that that the communication from the sites of the restricted areas are communicating with the remote node via the cellular telephone network 20, hence, the cellular telephone network is acting as the communication network 14 for the system as well as for the handheld devices 8 used for presenting access credentials to the system. The cellular telephone network acting as communication network 14 is not necessary the same cellular telephone network 20 that communicates with the handheld devices 8.

Figure 2B:
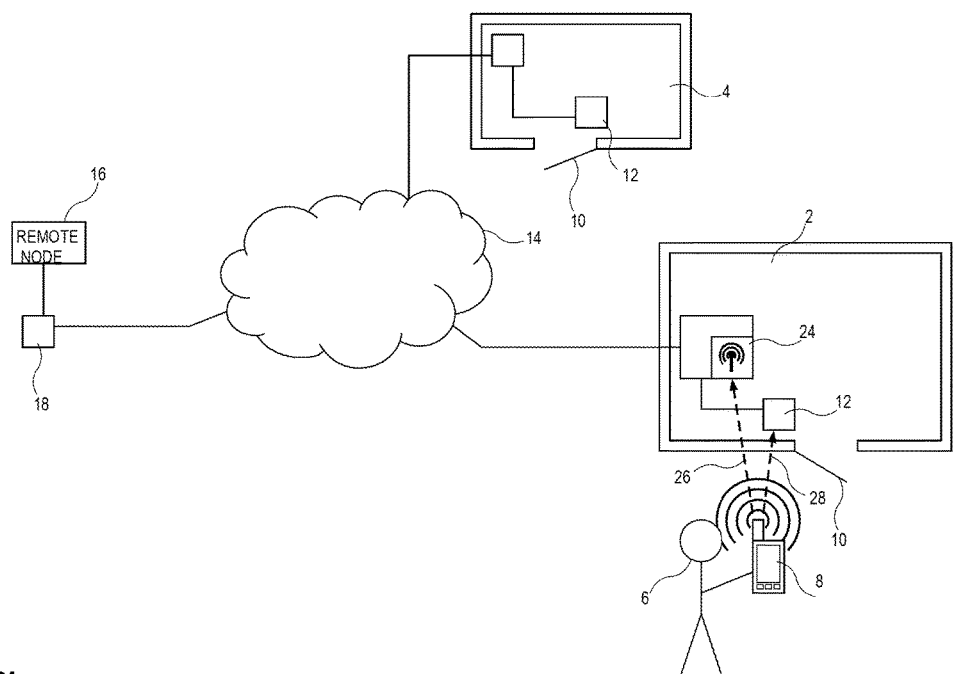
FIG. 2b is a schematic overview of an alternative system that may include or implement embodiments.

Yet another alternative access system is showed in FIG. 2b. This access system is also very similar to the access system of FIG. 1 and includes many features of that system. It is also quite similar to the access system described in relation to FIG. 2a and may include many features of that system too. The access system depicted in FIG. 2b is connecting the access controllers 12, the remote node 16 and other devices of such a system via a data network 14. Depending on the distance between sites of the system the data network 14 may be a local area network (LAN), if the access system is deployed in a local area with short distances between the sites, a wide area network (WAN), if the area having access system sites is larger, and if remote sites is included the sites may be connected via the Internet using any known technology. These various network types and the technologies used to implement them may be combined in many ways known to the skilled person.

The system of FIG. 2b includes wireless access points 24 for short range communication, such access point 24 may alternatively or additionally be arranged in the access controller 12, hence the alternative wireless communication paths 26 and 28 drawn in FIG. 2b.

In order to access the restricted area 2 using this system the handheld device 8 is arranged to send an access request via the short range communication path 26, 28, to the access point 24 or the access controller 12, depending on which one of them being the access point. The access request includes an identifier which may be authorized directly by the access controller 12, if the identifier is stored there, or it may be sent to another access controller 12 or a central access rights database for authorisation. The other access controller 12 or the central access rights database may then return an authorisation signal or it may return data that allows the access controller 12 authorise the access request by itself.

Figure 3:
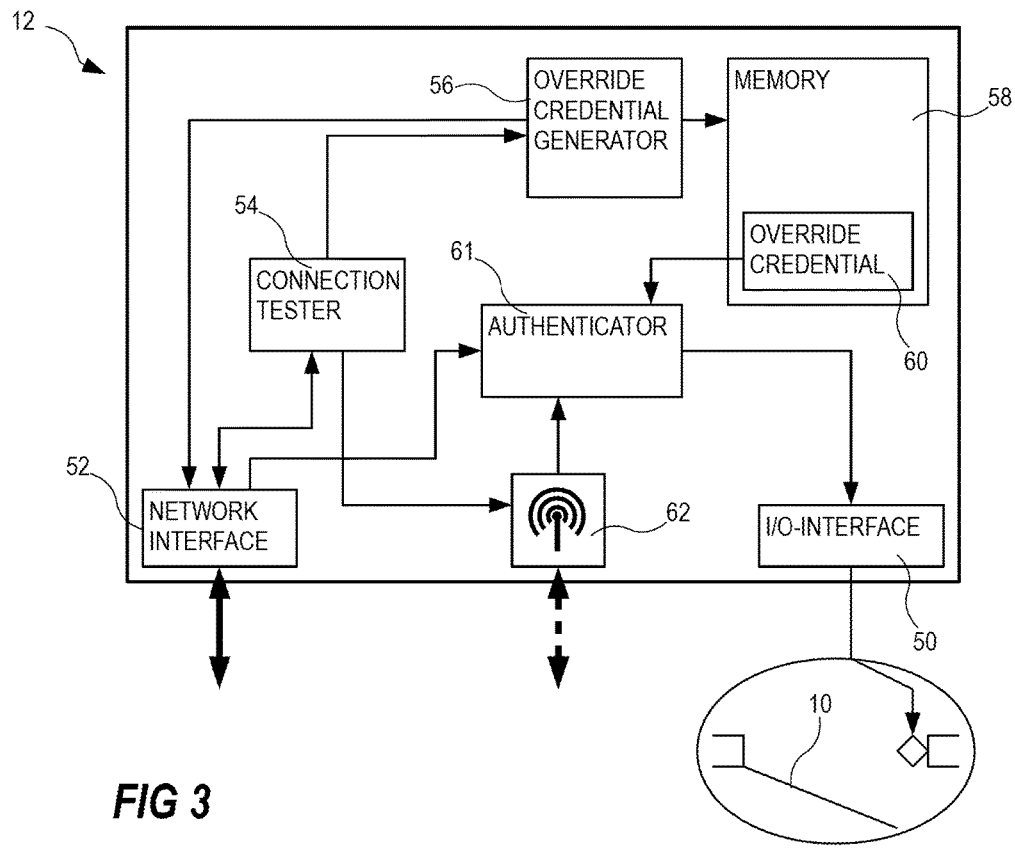
FIG. 3 is a schematic block diagram of an access controller according to embodiments.
Figure 4:
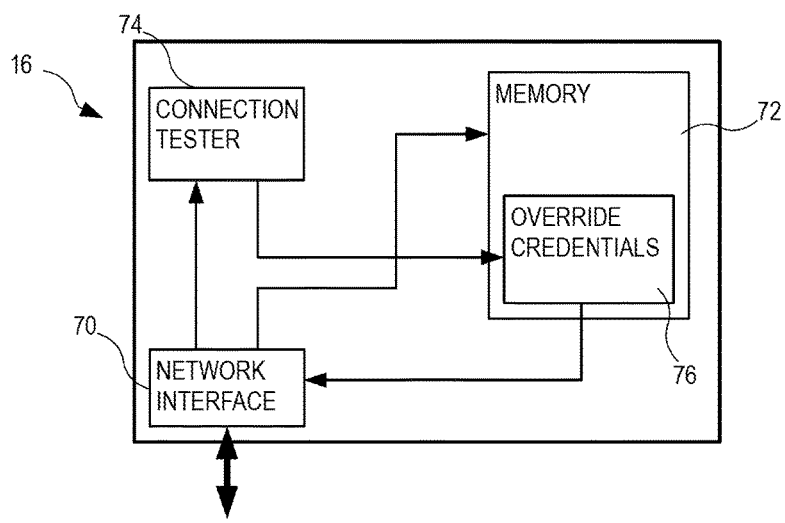
FIG. 4 is a schematic block diagram of a remote node according to embodiments.

Now referring to FIG. 3, the access controller 12 according to some embodiments includes an I/O-interface 50 arranged to send control signals to a door lock in order to control the state of the lock, e.g. switching between the states locked and open. Moreover, the access controller 12 includes a network interface 52 arranged to connect the access controller 12 to a local area network (LAN) of the site of the access controller 12, a connection tester 54, an override credential generator 56, a memory 58 storing generated override credentials 60, and an authenticator 61.

The connection tester 54 is a device arranged to detect if a connection to the remote node 16 is not working properly. This may be detected by implementing a scheme requiring an acknowledgment for general or specific messages sent to the remote node 16 and if no such acknowledgment is received generating a signal indicating that no connection to the remote node 16 is present.

The override credential generator 56 is a device arranged to generate an override credential code relating to a door 10 connected to the access controller 12. The override credential code may be a cryptographically generated code, a string of random characters, a random number, etc.

The memory may be any type of memory, e.g. a volatile memory or a non-volatile memory, as the storing of the override credentials is mainly of interest when the access controller 12 is running. The authenticator 61 is arranged to determine if an access request received at the access controller 12 is valid or not. This authentication process may be performed in a plurality of ways. For example may the access controller store in memory a plurality of identifiers that each authenticates a specific access credential or a specific combination of access credentials. Then when an access credential is received from the remote node and it is authenticated the authenticator signals to the door 10 or a locking device at the entrance that it should open and allow passage through the entrance. In embodiments, the authenticator will authenticate an override credential stored in memory of the access controller 12 in situations where no connection to the remote node 16 has been detected and signalled by the connection tester 54. In some embodiments the only time the override credential is to be authenticated for entrance through the passage is when there is no connection between the access controller of the passage and the remote node 16.

In some embodiments the access controller also includes a short range wireless communication interface 62, and in other embodiments such a wireless communication interface 62 may be a device external to the access controller 12 which then is accessed over the network interface 52 for use in wireless communication. The short range wireless communication interface 62 is, in some embodiments, activated in response to a signal from the connection tester. Thereby, it is possible to have the short range communication only be active in situations where a more secure network connection via the network interface 52 arranged for the access system is not available.

The remote node 16 is a networked device arranged to enable electronic access to the access system controlling access to the restricted areas 2, 4 using a handheld device 8. The remote node 16 may include a network interface 70, a memory 72, and a connection tester 74. The network interface 70 may be a network interface for a LAN installed at the site of the remote node 16. The remote node may then be connected to the access controller sites via a gateway or a router for the remote connecting network. Further, the connection to the handheld devices via a cellular network may be performed by having the remote note 16 communicate via a gateway between the LAN and the cellular network. Alternatively, a cellular network modem may be arranged in the remote node 16 itself, not illustrated in the figures. The remote node is arranged to receive and store override credentials 76 that are sent periodically from access controllers 12 in the system. These override credentials 76 are stored in the memory 72. According to some embodiments an older override credential is removed from memory 72 when a new override credential relating to the same access controller is received. The memory 72 may be any type of volatile memory or non-volatile memory. The override credentials may also be distributed over access controllers 12 connected to the same access system. Such system may have some redundancy by having override credentials stored at more than one access controller 12.

The connection tester 74 is a module of the remote node 16 arranged to detect when connections to access controllers 12 in the system fails. According to some embodiments the connection tester includes timers related to each of the access controllers in the system utilising the services of this remote node 16. The timer of a particular access controller 12 may then be reset when an override credential is received from that access controller 12. When the timer of a particular access controller expires without the remote node 16 receiving any updated override credential, the override credential relating to that particular access controller is set as a valid override credential for that particular access controller and may be provided to a handheld device that is authorized to access a restricted area controlled by the access controller in question.

The modules and functions of the remote node 16 may be implemented by program code stored in memory of the remote node 16 and executed by a processing unit, not shown, of the remote node 16. However, the modules and functions may also be implemented in hardware by means of logic circuitry or other types of electronic circuitry. Further, the remote node 16 may implement some modules and/or functions in hardware and some by means of program codes executed in the processing device. The processing device may be any type of processing unit known to the skilled person, e.g. a CPU.

Figure 5:
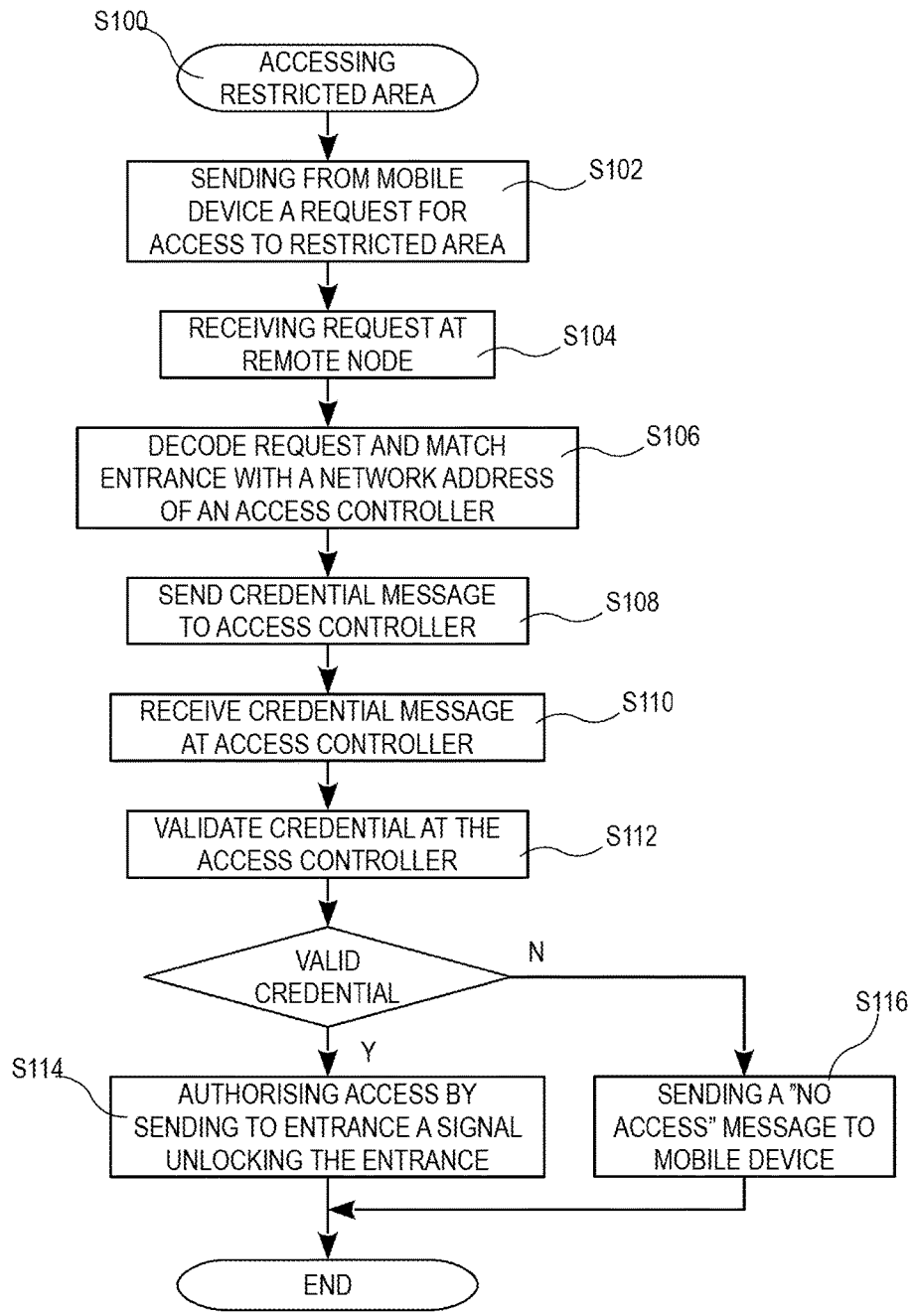
FIG. 5 is a flowchart of a method for accessing a restricted area.

According to some embodiments the process S100 for getting access to a restricted area 2, 4, by means of the handheld device 8 includes the steps showed in FIG. 5. A request for accessing a restricted area is sent from the handheld device, S102, via the cellular network 20 to the remote node 16. The access request may include an access credential. The access credential may be some authentication information stored in the handheld device, e.g. an identity of the handheld device or some authentication code stored in the handheld device, or it may be some authentication information provided to the handheld device from the user, e.g. a pin code, a password, a fingerprint, a photo, a retina reading, etc. Further, the access request may include information identifying the entrance through which access to the restricted area is requested. Such information may be based on the position of the handheld device, on information in a graphical code, e.g. barcode or QR-code, captured using the handheld device, an entrance code entered in the handheld device, a selection of an entrance in a graphical interface presented on the handheld device, etc.

The request for accessing the restricted area is received at the remote node, step S104, and then it is decoded by the remote node in order to match the entrance referred to in the request with a network address, S106. Then the remote node sends a credential message including the credential provided in the request to the address matched to the entrance, S108. The address matched to the entrance is an address of the access controller at the entrance. If the access controller at the address is arranged to control a plurality of entrances, an identification of the correct entrance may be added to the message including the credential in S108. The access controller 12 receives the message including the credential, S110, and validates the credential, S112, and if the credential is valid for access through the addressed entrance the access is authorized and a signal is sent to the entrance in order to unblock or unlock the entrance and allow the access requestor to enter through the entrance, S114. If the credential is not valid the entrance is not unblocked or unlocked. However, the system may be arranged to send a no access message to the handheld device S116.

Figure 6:
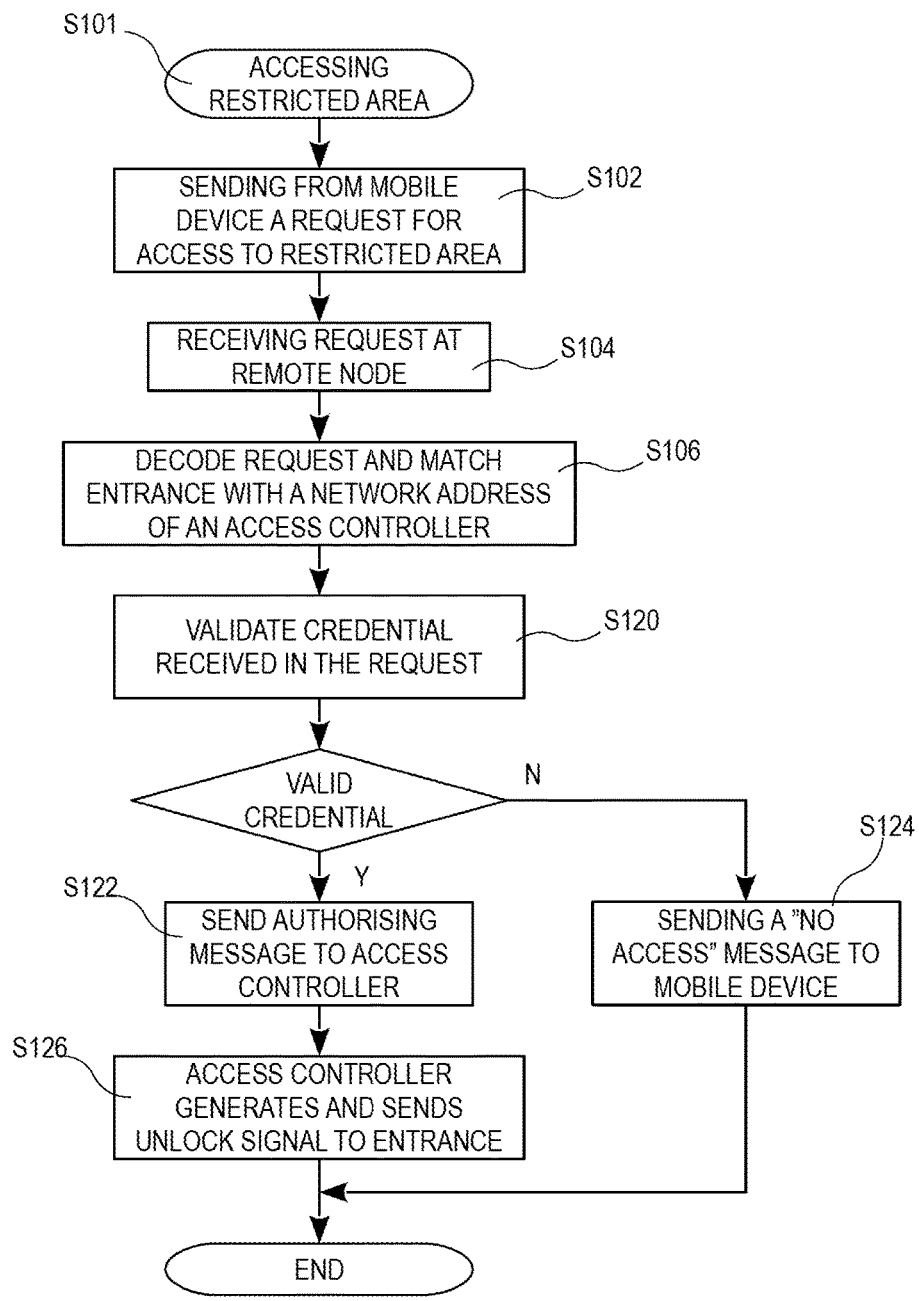
FIG. 6 is a flowchart of an alternative method for accessing a restricted area.

An alternative embodiment of the process for accessing a restricted area S101 is depicted in FIG. 6. The process is similar to the process described in FIG. 5 and the steps that are identical are referred to by the same reference numbers as in FIG. 5. The difference between the processes starts in the remote node where the remote node implementing the alternative process validates the credential as a credential allowing access to the entrance of the request, S120. If the credential is validated a message authorising the requested entrance to be unlocked is sent to the access controller 12, S122, if not a no access allowed message may be sent to the handheld device 8, S124. The authorising message is received in the access controller and the access controller generates an unblock signal or an unlock signal S126 and sends it to the entrance.

Figure 7:
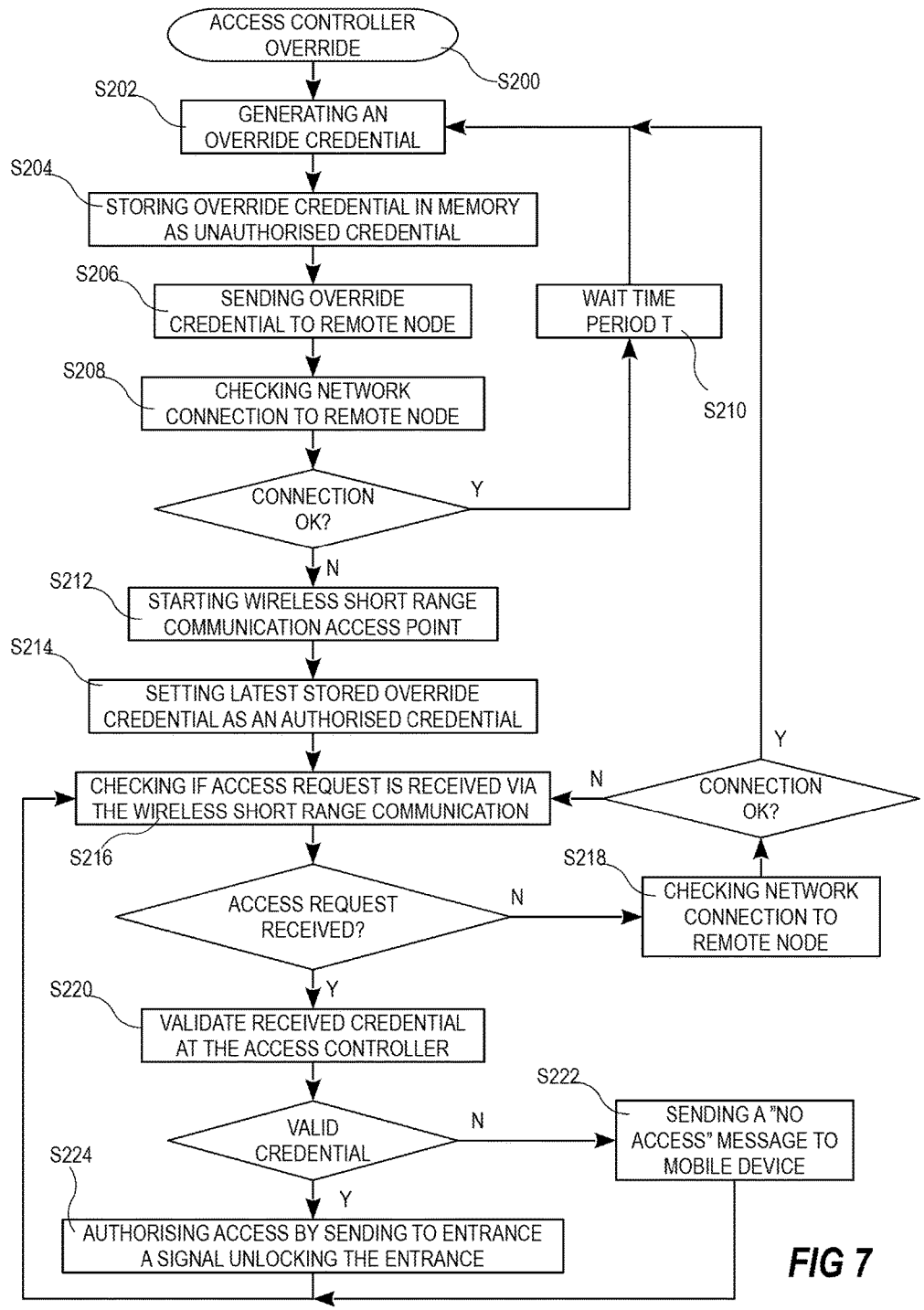
FIG. 7 is a flowchart of a method in an access controller for generating and processing override credentials and access requests.

The above systems and methods for gaining access to a restricted area may in many cases work satisfactory as long as the communication between the remote node 16 and the access controller 12 addressed is operating properly. However, if the communication between the remote node 16 and an access controller fails, then the entrance or entrances connected to this access controller may not be unlocked using the handheld device. In order to still enjoy all advantages of the handheld device based access scheme the access process of the access system may include an override process. According to some embodiments the access controller or access controllers of this type of systems may implement an override method S200 as described in FIG. 7.

The method includes having the access controller 12 generating a new override credential, S202, periodically, e.g. repeated every T seconds. The new override credential is then stored in memory as an unauthorized credential, S204. The credential being unauthorized means that the access controller will not authorise unlocking of entrance if this credential is used in an attempt to gain access via the entrance. The override credential is also sent to the remote node 16, S206. The process of handling the override credential in the remote node 16 will be described below in connection to FIG. 8.

The access controller also checks the connection to the remote node 16, S208, i.e. checks if the communication works properly. One way of doing this is to instruct the remoted node to return an acknowledgement message when it has received the override credential. If no acknowledgement message is returned to the access controller, the access controller will act as if no connection with the remote does not work properly, i.e. is failing.

If the connection is determined to work properly then the system waits a predetermined time T before generating a new override credential. The time between generating two credentials may depend on the security level required and latencies in the network relating to communicating the override credentials to the remote node. The higher the security level is, the shorter the time T should be, and the longer the latencies are, the longer the time T should be. The time T may generally be in the range of seconds to hours.

However, if the connection is down, i.e. not working properly, then the access controller is arranged to start the wireless short range communication access point 62, S212. As previously mentioned, the wireless short range communication access point 62 may be arranged in the same housing as the access controller or it may be arranged externally and communicating with the access controller via LAN, e.g. an Ethernet connection. Moreover, the access controller sets the latest sent and acknowledged override credential to an authorized credential, S214. The setting may be implemented by having a flag, a data post, or other type of data field connected to the override credential stored in the memory of the access controller and setting the data field to a value indicating that the override credential is authorized. This means that the access control system, in particular the access controller, will accept the latest override credential that has been received at the remote node as a valid credential gaining access to a restricted area when used. Then, because the communication with the remote node is down, a handheld device is not able to request access to restricted areas via the entrance controlled by this particular access controller using the basic method. Instead the access controller is accepting access requests via the wireless short range communication access point 62. Therefore the access controller is checking for access requests via the wireless short range communication access point 62, S216. If no such access request is received then the access controller checks if the communication to the remote node has been restored, S218, if not, the process returns to S216 to check for an access request via wireless short range communication. On the other hand, if the communication to the remote note has been restored then the access controller returns to S202, generating new override credentials and receiving access requests from the remote node.

If an access request is received via wireless short range communication then the received credential is validated at the access controller, S220. If the received credential is the override credential then it is determined as a valid credential by the access controller and if the access controller includes a data base over credentials authorized to access the entrance or entrances then the access controller may validate these credentials as well when received via the short range wireless communication. Hence, if the received credential is not valid, then a "no access" message may be sent to the handheld device and the entrance remains locked, S222, the process then returns to S216 checking for further access requests via wireless short range communication. However if the credential received is valid, then the access controller authorise access via the entrance by sending a signal instructing the entrance to unlock, S224. Then the process returns to check for further access requests via wireless short-range communication.

Figure 8:
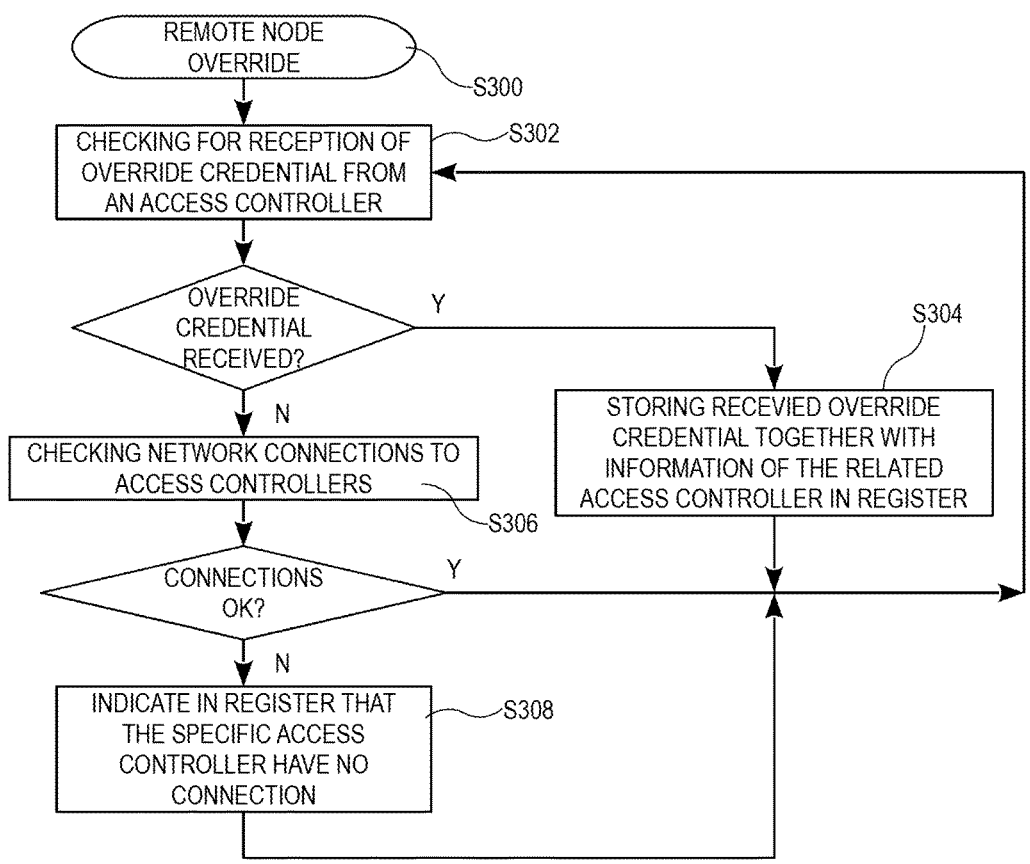
FIG. 8 is a flowchart of a method in a remote node for handling override credentials.

The remote node 16 operating together with the access controller in this scheme may implement a method S300 for managing the override credentials as described in FIG. 8. According to such embodiments the remote node is checking for override credentials received from an access controller via the network, S302. If an override credential is received the override credential is stored in a register together with information of the origin of the override credential, S304. Thereby the remote node may tell apart override credentials from different access controllers 12 and thus serve a plurality of access controllers 12. When, the override credential has been registered, i.e. stored, the process returns to S302 in order to check for new override credentials from any access controller 12 related to the remote node 16.

However, if no override credential is received the process checks the network connections used in communicating with the access controllers 12, S306. The checking of the connections may be implemented in a lot of ways. For example, the remote node 16 may utilise the fact that new override credentials will be sent periodically from the access controllers. As previously described in connection with the process of the access controller 12 the time period between consecutive transmissions from an access controller is T. The remote node 16 may set a timer related to each access controller and keep track of if override credentials are received within the expected time limits. The timer should be greater than the periodicity of the transmission of the override credentials, i.e. longer than T, in order to account for variation in latency in transmission over the connection. If the timer expires and no new override credential has been received from the access controller 12 the connection to that access controller will be deemed non-operating. Other methods for checking the connection is to periodically send test messages to the access controllers 12.

If the connection is found to be operating properly, then the process returns to S302 checking for new override credentials. On the other hand if the connection is not found to work properly, then the related access controller is marked in the registry as not having a network connection that work properly. When the registry has been changed the process returns to check for new override credentials.

Figure 9:
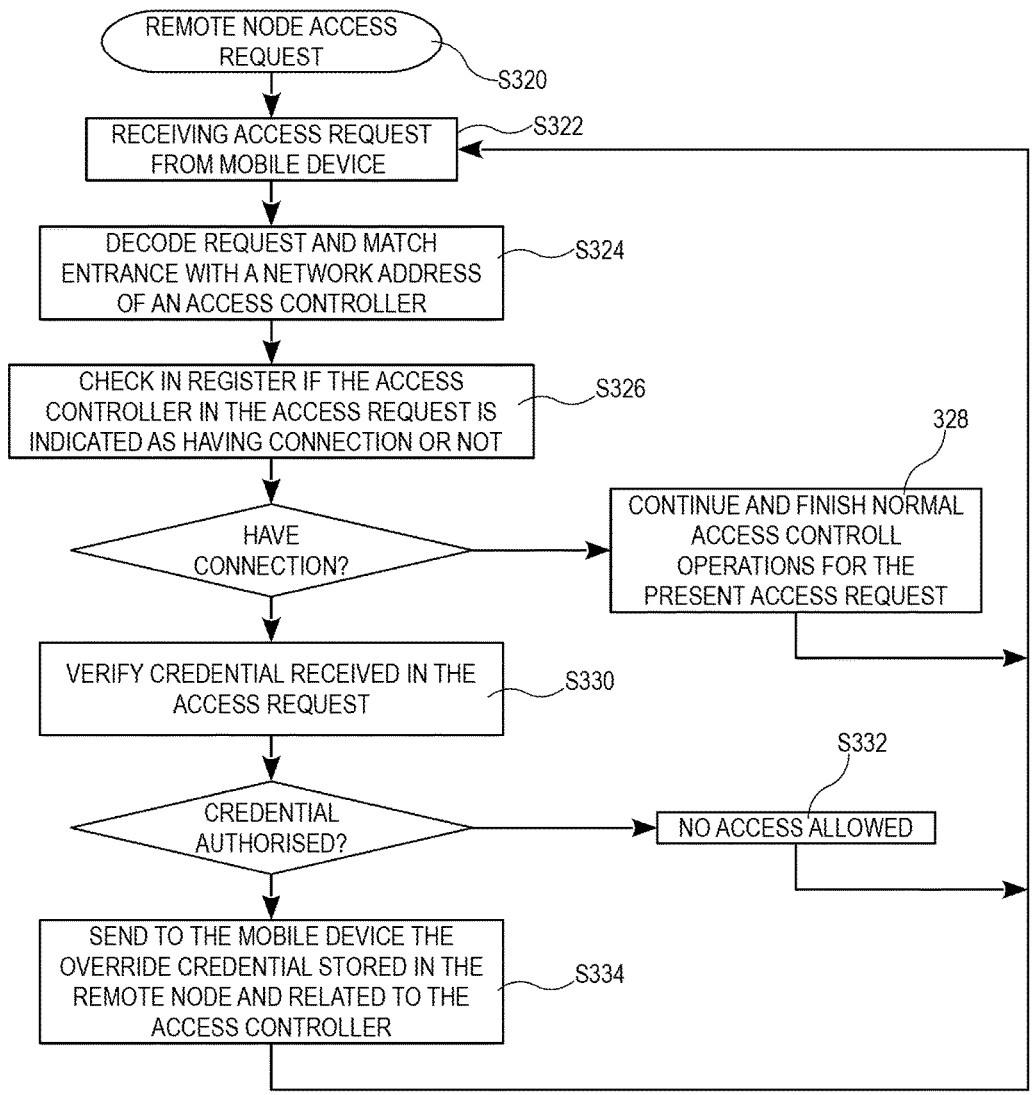
FIG. 9 is a flowchart of a method in a remote node for handling access requests.

Further, the remote node receives and handles access requests from the handheld devices. The process for handling the access requests may be implemented as described in connection with FIG. 9. In this remote node access request handling process, S320, the remote node receives an access request from a handheld device, S322. The access request is decoded and matched to an access controller, S324. The matching may be based on an identifier of the access controller or the entrance included in the access request. This identifier may have been acquired by the handheld device by means of user input, camera input, position sensor input, etc. When the access controller related to the request has been identified the status of the connection between the access controller and the remote node is checked in the register, S326. If the connection between the access controller identified in the request and the remote node is not indicated as not operating properly, i.e. the communication connection is up and running and there should be no communication problems, then the normal access control operations are performed, S328, and the process returns to S322 when the access control operations has been concluded in order to wait for another access request. Some possible embodiments of normal access control operations have been described in connection with FIG. 5 starting at S108 and in FIG. 6 starting at S120. If the register indicates that the communication between the remote node 16 and the identified access controller 12 is not working properly, i.e. no communication may be possible at the time being, then the remote node verifies the credential received in the access request, S330, in order to verify that the handheld device or the user of the handheld device is a valid access requester in the present access system and to check if an access request for the entrance based on the credential is authorized to gain access through the entrance. If no access is authorized then the process simply denies access and returns to S322 and checks for further access requests. The system may provide a message to the handheld device indicating that it was not allowed access based on its credentials. However, if the credential is authorized to gain access through the entrance, then the remote node sends, via the cellular network, the latest stored override credential for the particular entrance to the handheld device, S334. When, the override credential has been sent the process returns to S322 waiting for further access requests from handheld devices.

In the present application a cellular network is to be understood as a radio network that is distributed over areas in cells, where each cell includes a base station. The combined radio cover from a plurality of cells results in a larger radio coverage. Handheld devices communicating using the cellular network may be used even when moving through an area by having the system implementing handover of the device between different cells as the device is moving through the different cover areas.

What is claimed is:

1. A method for allowing access to an area having a blocked entrance, wherein the blocking of the entrance is controlled by an access controller and the access controller is arranged to unblock the entrance upon receipt of an authorized credential, the method comprising:

repeatedly updating, by an override credential generator in the access controller, an override credential in the access controller;

sending, by an I/O interface in the access controller, the updated override credential from the access controller to a remote node;

repeatedly checking, by a connection tester in the access controller, connectivity between the remote node and the access controller;

detecting, by the connection tester in the access controller, failure of connectivity between the access controller and the remote node;

setting, by an override credential generator in the access controller, the override credential as an authorized credential in the access controller in response to the detection of failure of connectivity; and allowing, by the I/O interface in the access controller, access through the blocked entrance upon receipt of the override credential in an access request to the area received by the access controller.

2. The method according to claim 1, further comprising initiating, by the access controller, a wireless short range communication access point in response to the detection of failure of connectivity by the connection tester, the wireless short range communication access point being arranged to communicate with the access controller.

3. The method according to claim 2, wherein the wireless short range communication access point is arranged in the same housing as the access controller.

4. The method according to claim 1, further comprising receiving, at the access controller from a handheld communication device, the access request including the override credential.

5. The method according to claim 4, wherein the handheld communication device is enabled to communicate via a cellular network, wherein the remote node is arranged in a remote network and is accessible via the cellular network, and wherein the method further comprises:
sending, from the handheld device to the remote node in the remote network via the cellular network, an access request for the entrance controlled by the access controller.

6. The method according to any claim 1, wherein the access controller is connected to a local network.

7. The method according to claim 1, wherein the remote node is connected to a remote network.

8. The method according to claim 1, wherein the access controller is connected to the remote node for communication via a remote network connection.

9. An access controller for allowing access to an area having a blocked entrance that is arranged to unblock the entrance upon receipt of an authorized credential, the access controller comprising:
an I/O-interface arranged to send signals to an entrance for unlocking or locking the entrance;
a network interface for communicating with a communication network including a remote node;
a memory;
an override credential generator arranged to repeatedly update an override credential, send the updated override credential via the network interface to the remote node, and store the updated override credential in the memory;
a connection tester arranged to repeatedly test a connection with the remote node connected to the access controller; and
an authorisation indicator connected to the stored override credential arranged to indicate whether the override credential is authorized for access or not, the authorisation indicator being controlled based on result from the connection tester, wherein the override credential is authorized for access in response to the detection of failure of connectivity;
wherein the I/O interface is further arranged to send signals to the entrance for unlocking the entrance upon receipt of the override credential in an access request to the area.

10. The access controller according to claim 9, further comprising a short range communication access point arranged to be initiated when connection tester detects connection failure.

11. The access controller according to claim 10, wherein the short range communication access point is arranged in the same housing as the access controller.

12. The access controller according to claim 10, further comprising an authenticator arranged to receive an access request from the short range communication access point and to send an unlock signal via the I/O-interface.

13. The access controller according to claim 11, further comprising an authenticator arranged to receive an access request from the short range communication access point and to send an unlock signal via the I/O-interface.

14. A method for allowing access to an area having a blocked entrance, wherein the blocking of the entrance is controlled by an access controller and the access controller is arranged to unblock the entrance upon receipt of an authorized credential, and wherein the access controller is part of an access control system and communicates with a remote node, also being part of the access control system, via a remote network connection, the method comprising:
detecting, by a connection tester in the access controller, failure of connectivity over the network connection between the access controller and the remote node;
initiating, by the access controller, a wireless short range communication access point in response to the detection of failure of connectivity by the connection tester;
receiving, at the access controller via the wireless short range communication access point, a credential authorising the access controller to unblock the entrance; and
allowing, by an I/O interface in the access controller, access through the blocked entrance to the area by sending signals to the entrance for unlocking the entrance.

15. The method according to claim 14, wherein the wireless short range communication access point is arranged in the same housing as the access controller.

16. The method according to claim 14, further comprising:
repeatedly updating, by an override credential generator in the access controller, an override credential related to the access controller;
sending, by an I/O interface in the access controller, the updated override credential from the access controller to the remote node; and
setting, by an override credential generator in the access controller, the override credential as an authorized credential in the access controller in response to the detection of failure of connectivity;
wherein the credential received at the access controller via the wireless short range communication access point is the override credential.

* * * * *